(12) United States Patent
Adams et al.

(10) Patent No.: US 8,141,845 B2
(45) Date of Patent: Mar. 27, 2012

(54) FUEL CELL SUPPLY HAVING FUEL COMPATIBLE MATERIALS

(75) Inventors: Paul Adams, Monroe, CT (US);
Andrew J. Curello, Hamden, CT (US);
Floyd Fairbanks, Naugatuck, CT (US)

(73) Assignee: Societe Bic (FR)

( * ) Notice: Subject to any disclaimer, the term of this patent is extended or adjusted under 35 U.S.C. 154(b) by 388 days.

(21) Appl. No.: 10/596,085

(22) PCT Filed: Nov. 24, 2004

(86) PCT No.: PCT/US2004/039241
§ 371 (c)(1),
(2), (4) Date: May 11, 2007

(87) PCT Pub. No.: WO2005/055338
PCT Pub. Date: Jun. 16, 2005

(65) Prior Publication Data
US 2007/0277368 A1 Dec. 6, 2007

(51) Int. Cl.
*F16K 51/00* (2006.01)
(52) U.S. Cl. ............... 251/144; 220/495.01; 220/23.9; 220/23.91
(58) Field of Classification Search .......... 251/144, 251/149.6, 368; 429/34; 320/101; 220/9.1, 220/86.1, 495.01, 23.9, 23.91; 222/207, 222/105, 592
See application file for complete search history.

(56) References Cited

U.S. PATENT DOCUMENTS

| | | | | |
|---|---|---|---|---|
| 3,795,558 | A * | 3/1974 | Dabney et al. | 156/73.1 |
| 5,244,615 | A * | 9/1993 | Hobbs | 264/83 |
| 5,390,814 | A * | 2/1995 | Christine et al. | 222/105 |
| 5,830,599 | A * | 11/1998 | Okamoto et al. | 429/163 |
| 5,976,725 | A * | 11/1999 | Gamo et al. | 429/25 |
| 6,021,930 | A * | 2/2000 | de Pous et al. | 222/633 |
| 6,506,513 | B1 * | 1/2003 | Yonetsu et al. | 429/34 |
| 2002/0197522 | A1 * | 12/2002 | Lawrence et al. | 429/34 |
| 2003/0082427 | A1 * | 5/2003 | Prasad et al. | 429/34 |
| 2004/0023081 | A1 * | 2/2004 | Ushiro et al. | 429/9 |
| 2004/0023087 | A1 * | 2/2004 | Redmond | 429/19 |
| 2004/0072049 | A1 * | 4/2004 | Becerra et al. | 429/34 |
| 2004/0096721 | A1 * | 5/2004 | Ohlsen et al. | 429/34 |
| 2004/0131903 | A1 * | 7/2004 | Shioya | 429/22 |
| 2005/0058879 | A1 * | 3/2005 | Guay | 429/38 |
| 2005/0074643 | A1 * | 4/2005 | Adams et al. | 429/19 |
| 2005/0079128 | A1 * | 4/2005 | deVos et al. | 423/658.2 |
| 2006/0172171 | A1 * | 8/2006 | Deinzer et al. | 429/34 |

* cited by examiner

*Primary Examiner* — John Fristoe, Jr.
*Assistant Examiner* — Marina Tietjen
(74) *Attorney, Agent, or Firm* — The H.T. Than Law Group

(57) ABSTRACT

The present invention is directed to a fuel cell supply for a fuel cell having an outer casing, a liner member containing methanol, and a valve component comprising a valve body member and a slidable body member disposed inside the valve body member. The slidable body member is normally biased toward a valve seat surface to seal the valve component and the slidable body member can be moved away from the valve seat surface to open the valve component. The liner member, the valve body member and the slidable body member are made from at least two different materials and wherein at least one of the members compatible with methanol. Hence, each component can be selected from material(s) that is substantially optimal for its function in the fuel supply.

9 Claims, 4 Drawing Sheets

FUEL CELL SUPPLY HAVING FUEL COMPATIBLE MATERIALS

FIELD OF THE INVENTION

This invention generally relates to fuel cell supplies, and more particularly to fuel supplies that are compatible with fuel cell fuels, including methanol.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel and more efficient than portable power storage, such as lithium-ion batteries.

In general, fuel cell technologies include a variety of different fuel cells, such as alkali fuel cells, polymer electrolyte fuel cells, phosphoric acid fuel cells, molten carbonate fuel cells, solid oxide fuel cells and enzyme fuel cells. Today's more important fuel cells can be divided into three general categories, namely fuel cells utilizing compressed hydrogen ($H_2$) as fuel, proton exchange membrane (PEM) fuel cells that use methanol ($CH_3OH$), sodium borohydride ($NaBH_4$), hydrocarbons (such as butane) or other fuels reformed into hydrogen fuel, and PEM fuel cells that use methanol ($CH_3OH$) fuel directly ("direct methanol fuel cells" or DMFC). Compressed hydrogen is generally kept under high pressure, and is therefore difficult to handle. Furthermore, large storage tanks are typically required, and cannot be made sufficiently small for consumer electronic devices. Conventional reformat fuel cells require reformers and other vaporization and auxiliary systems to convert fuels to hydrogen to react with oxidant in the fuel cell. Recent advances make reformer or reformat fuel cells promising for consumer electronic devices. DMFC, where methanol is reacted directly with oxidant in the fuel cell, is the simplest and potentially smallest fuel cell, and also has promising power application for consumer electronic devices.

DMFC for relatively larger applications typically comprises a fan or compressor to supply an oxidant, typically air or oxygen, to the cathode electrode, a pump to supply a water/methanol mixture to the anode electrode and a membrane electrode assembly (MBA). The MEA typically includes a cathode, a PEM and an anode. During operation, the water/methanol liquid fuel mixture is supplied directly to the anode, and the oxidant is supplied to the cathode. The chemical-electrical reaction at each electrode and the overall reaction for a direct methanol fuel cell are described as follows:

Half-reaction at the anode:

$$CH_3OH + H_2O \rightarrow CO_2 + 6H^+ + 6e^-$$

Half-reaction at the cathode:

$$O_2 + 4H^+ + 4e^- \rightarrow 2H_2O$$

The overall fuel cell reaction:

$$CH_3OH + 1.5O_2 \rightarrow CO_2 + 2H_2O$$

Due to the migration of the hydrogen ions ($H^+$) through the PEM from the anode through the cathode and due to the inability of the free electrons ($e^-$) to pass through the PEM, the electrons must flow through an external circuit, which produces an electrical current through the external circuit. The external circuit may be any useful consumer electronic devices, such as mobile or cell phones, calculators, personal digital assistants and laptop computers, among others. DMFC is discussed in U.S. Pat. Nos. 5,992,008 and 5,945,231, which are incorporated by reference in their entireties. Generally, the PEM is made from a polymer, such as Nafion® available from DuPont, which is a perfluorinated material having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

The cell reaction for a sodium borohydride reformer fuel cell is as follows:

$$NaBH_4(\text{aqueous}) + 2H_2O \rightarrow (\text{heat or catalyst}) \rightarrow 4(H_2) + (NaBO_2)(\text{aqueous})$$

$$H_2 \rightarrow 2H^+ + 2e^- (\text{at the anode})$$

$$2(2H^+ + 2e^-) + O_2 \rightarrow 2H_2O (\text{at the cathode})$$

Suitable catalysts include platinum and ruthenium, among other metals. The hydrogen fuel produced from reforming sodium borohydride is reacted in the fuel cell with an oxidant, such as $O_2$, to create electricity (or a flow of electrons) and water byproduct. Sodium borate ($NaBO_2$) byproduct is also produced by the reforming process. Sodium borohydride fuel cell is discussed in United States published patent application no. 2003/0082427, which is incorporated herein by reference.

However, the known art does not discuss fuel supplies made from materials that are compatible with the fuel(s) contained therein.

SUMMARY OF THE INVENTION

The present invention is directed to a fuel supply for fuel cells that is compatible with the fuel.

The present invention is further directed to a fuel supply for fuel cells that is compatible with methanol.

The present invention is further directed to a fuel supply wherein each component is made from material(s) that is substantially optimal for its function in the fuel supply.

The present invention is directed to a fuel cell supply for a fuel cell having an outer casing, a liner member containing fuel, such as methanol, and a valve component comprising a valve body member and a slidable body member disposed inside the valve body member. The slidable body member is normally biased toward a valve seat surface to seal the valve component and the slidable body member can be moved away from the valve seat surface to open the valve component. The liner member, the valve body member and the slidable body member are made from at least two different materials and wherein at least one of the members is compatible with methanol. Hence, each component can be selected from material(s) that is substantially optimal for its function in the fuel supply.

The present invention is also directed to a fuel supply for a fuel cell comprising an outer casing encasing an inner liner containing fuel and a first valve component. The valve component comprises a valve body and a slidable body disposed inside the valve body. The slidable body is normally biased toward a valve seat surface to seal the valve component and can be moved away from the valve seat surface to open the valve component. The inner liner is preferably made from a fluorinated polymer.

The valve body can be press-fitted to an opening in the inner liner and the valve body can be ultrasonically welded to an opening in the outer casing.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE PREFERRED EMBODIMENTS

Figure 1:
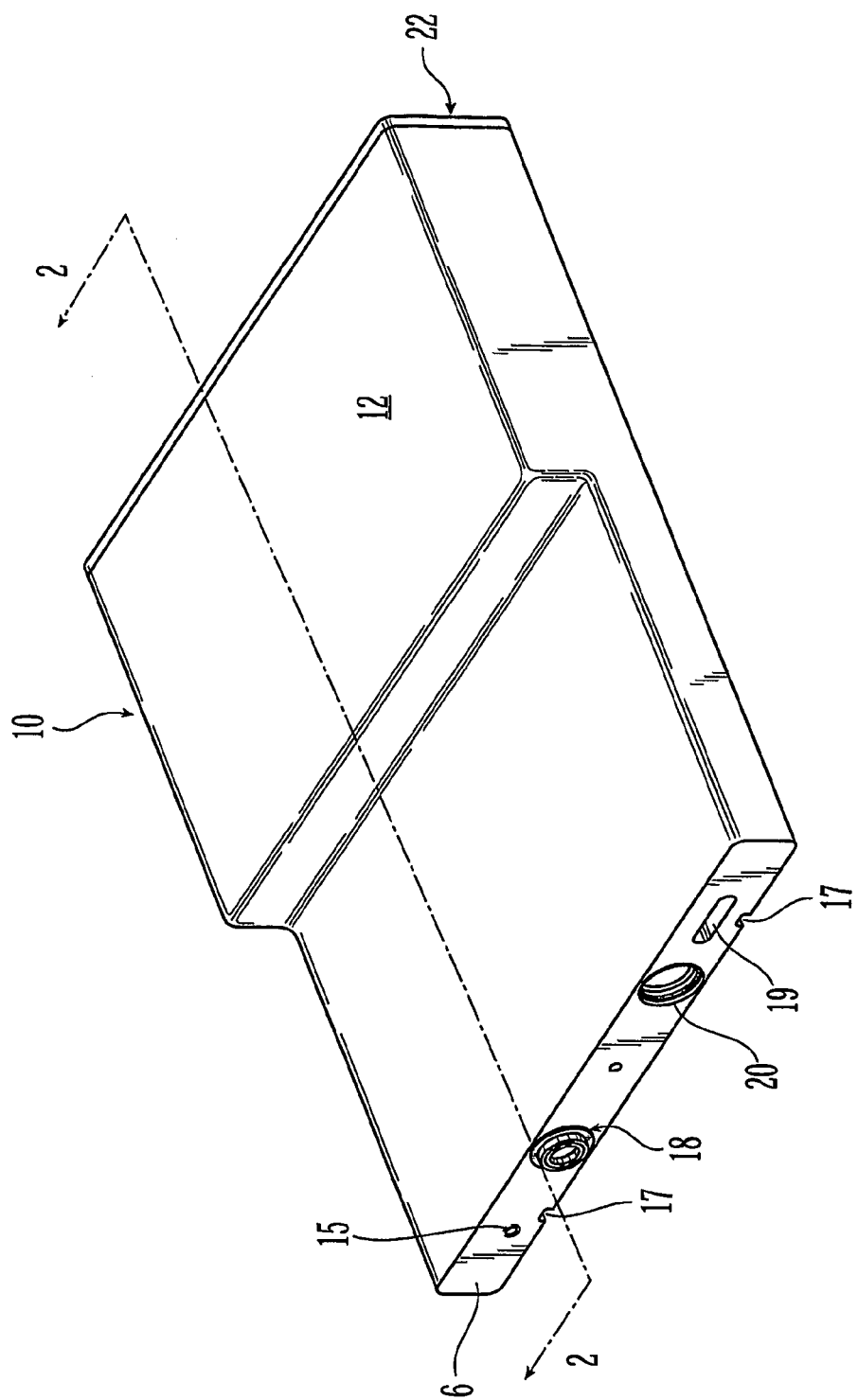
FIG. 1 is a perspective view of a fuel supply in accordance to the present invention.

As illustrated in the accompanying drawings and discussed in detail below, the present invention is directed to a fuel supply, which stores fuel cell fuels such as methanol and water, methanol/water mixture, methanol/water mixtures of varying concentrations or pure methanol. Methanol is usable in many types of fuel cells, e.g., DMFC, enzyme fuel cell and reformat fuel cell, among others. The fuel supply may contain other types of fuel cell fuels, such as ethanol or alcohols, chemicals that can be reformatted into hydrogen, or other chemicals that may improve the performance or efficiency of fuel cells. Fuels also include potassium hydroxide (KOH) electrolyte, which is usable with metal fuel cells or alkali fuel cells, and can be stored in fuel supplies. For metal fuel cells, fuel is in the form of fluid borne zinc particles immersed in a KOH electrolytic reaction solution, and the anodes within the cell cavities are particulate anodes formed of the zinc particles. KOH electrolytic solution is disclosed in United States published patent application no. 2003/0077493, entitled "Method of Using Fuel Cell System Configured to Provide Power to One or more Loads," published on Apr. 24, 2003, which is incorporated herein by reference in its entirety. Fuels also include a mixture of methanol, hydrogen peroxide and sulfuric acid, which flows past a catalyst formed on silicon chips to create a fuel cell reaction. Fuels also include aqueous sodium borohydride ($NaBH_4$) and water, discussed above. Fuels further include hydrocarbon fuels, which include, but are not limited to, butane, kerosene, alcohol and natural gas, disclosed in United States published patent application no. 2003/0096150, entitled "Liquid Hereto-Interface Fuel Cell Device," published on May 22, 2003, which is incorporated herein by reference in its entirety. Fuels also include liquid oxidants that react with fuels. The present invention is, therefore, not limited to any type of fuels, electrolytic solutions, oxidant solutions or liquids or solids contained in the supply or otherwise used by the fuel cell system. The term "fuel" as used herein includes all fuels that can be reacted in fuel cells or in the fuel supply, and includes, but is not limited to, all of the above suitable fuels, electrolytic solutions, oxidant solutions, liquids, solids and/or chemicals and mixtures thereof.

As used herein, the term "fuel supply" includes, but is not limited to, disposable cartridges, refillable/reusable cartridges, containers, cartridges that reside inside the electronic device, removable cartridges, cartridges that are outside of the electronic device, fuel tanks, fuel refilling tanks, other containers that store fuel and the tubings connected to the fuel tanks and containers. While a cartridge is described below in conjunction with the exemplary embodiments of the present invention, it is noted that these embodiments are also applicable to other fuel supplies and the present invention is not limited to any particular type of fuel supplies.

The fuel supply of the present invention can also be used to store fuels that are not used in fuel cells. These applications include, but are not limited to, storing hydrocarbons and hydrogen fuels for micro gas-turbine engine built on silicon chips, discussed in "Here Come the Microengines," published in The Industrial Physicist, (December 2001/January 2002) at pp. 20-25. Other applications include storing traditional fuels for internal combustion engines, and hydrocarbons, such as butane for pocket and utility lighters and liquid propane.

Fuels, in general, can have degrading effects on fuel supplies, and in accordance with one aspect of the present invention materials for the manufacture of fuel supplies and their components are selected to be compatible with fuels. More specifically, methanol fuel can degrade materials that come into contact with it. As discussed below, the fuel supplies in accordance to the present invention are compatible with methanol.

Figure 2:
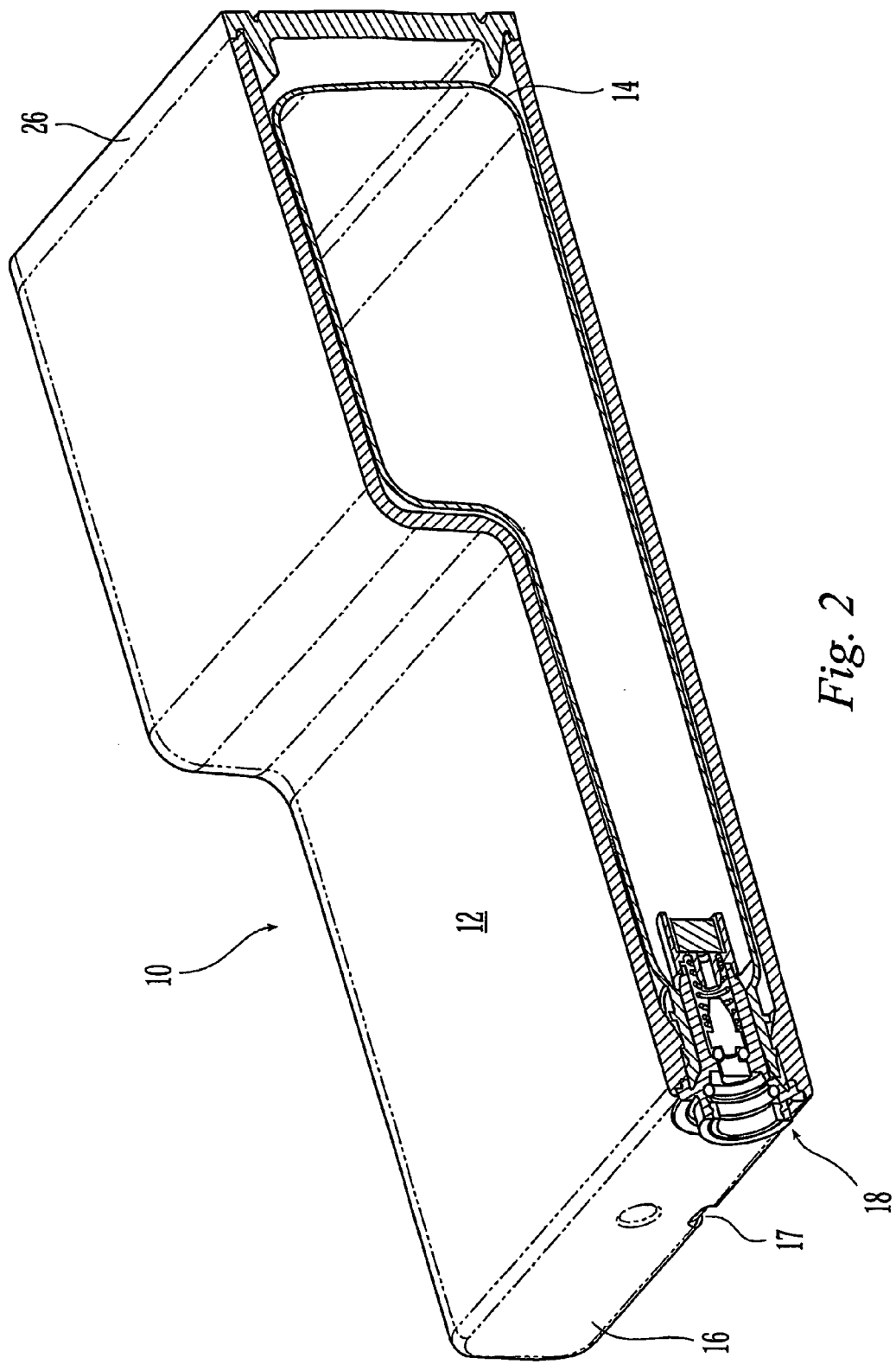
FIG. 2 is a perspective cross-sectional view of the fuel supply of FIG. 1 along line 2-2.
Figure 3:
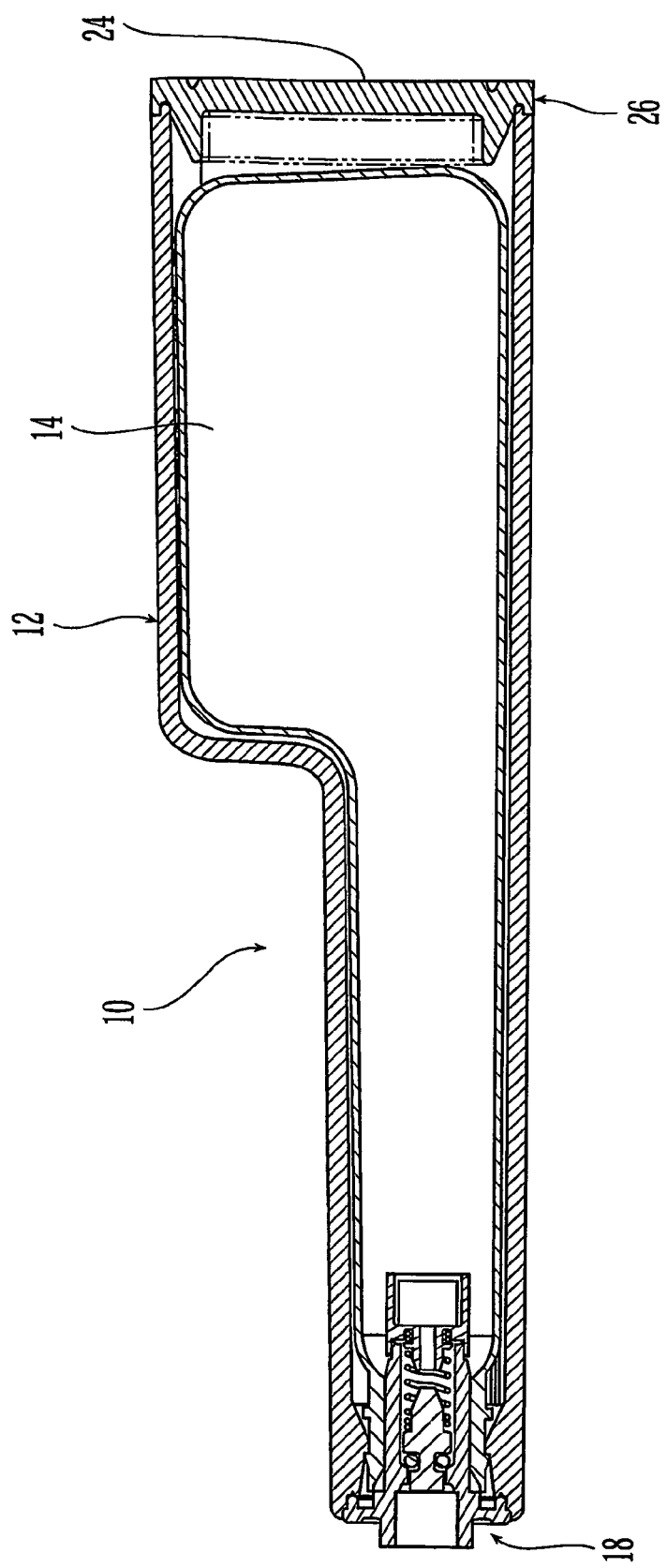
FIG. 3 is a plan view of the fuel supply shown in FIG. 2.

Referring to FIGS. 1-3, fuel cartridge 10 can have any shape, and is sized and dimensioned to supply fuel to fuel cells and to fit into predetermined receiving slots on electronic devices that the fuel cells power. Cartridge 10 has outer casing 12 and inner bladder or liner 14, which contains the fuel. Preferably, outer casing 12 is more rigid than liner 14, and protects the inner liner, which is preferably flexible. Cartridges that comprise an outer casing and an inner liner are fully disclosed in commonly owned, co-pending U.S. patent application Ser. No. 10/629,004, entitled "Fuel Cartridge with Flexible Liner," filed on Jul. 29, 2003. The '004 application is also incorporated herein by reference in its entirety. Other fuel supplies include those disclosed in co-pending patent application Ser. No. 10/356,793, entitled "Fuel Cartridge for Fuel Cells," filed on Jan. 31, 2003. The disclosure of this application is hereby incorporated in its entirety.

At front side 16, cartridge 10 has nozzle 18 and fill port 26. Fill port 20 is used to transport fuel to liner 14 during the manufacturing process and is sealed after a predetermined amount of fuel, e.g., about 85% to 95% of the capacity of liner 14, has been transported into the liner. Front side 16 also has asymmetric alignment aperture 15, which is sized and dimensioned to receive a matching protrusion disposed on the device that receives cartridge 10 (not shown). When cartridge 10 is correctly inserted, the protrusion is received by aperture 15 and the cartridge can be fully inserted. When cartridge 10 is incorrectly inserted, e.g., upside down, the protrusion will bump against front side 16 and the cartridge cannot be inserted.

Referring to FIGS. 1 and 3, cartridge 10 defines on its underside at least one guide rail 17, which is adapted to glide or slide on a corresponding rail on the device (not shown) to facilitate the insertion of the cartridge. Additionally, front side 16 also defines electrical interface 19, which may contain the necessary electrical contacts to connect the cartridge to the electronic device or to the fuel cell that powers the electrical device. Electrical interface 19 may also be connected to an electrically readable fuel gage, security devices or an information storage device, such as an EEPROM. Fuel gages, security devices and information storage devices are fully disclosed in co-pending application entitled "Fuel Cell System Including Information Storage Device and Control System," filed on even date herewith. This co-pending patent application is incorporated herein by reference in its entirety.

At rear side 22, cartridge 10 has vent 24 disposed on cover 26 to allow air in the cartridge to vent when the liner is being filled. Vent 24 also allows air to enter the cartridge as fuel is transported from the cartridge to prevent a partial vacuum from forming inside the cartridge. Vent 24 also prevents liquid from exiting the cartridge. Preferably, vent 24 has a membrane that allows air or other gases to enter or leave the cartridge, but keeps liquid from entering or leaving the cartridge. Such gas permeable, liquid impermeable membrane is disclosed in co-pending '004 patent application and in U.S. Pat. No. 3,508,708, entitled "Electric Cell with Gas Permeable Vent Stopper," issued on Apr. 21, 1970, and in U.S. Pat. No. 4,562,123, entitled "Liquid Fuel Cell," issued on Dec. 31, 1985. The disclosures of these references are incorporated herein by reference in their entireties. Such membranes can be made from polytetrafluoroethylene (PTFE), nylon, polyamides, polyvinylidene, polypropylene, polyethylene or other polymeric membrane. A commercially available hydrophobic PTFE microporous membrane can be obtained from W.L. Gore Associates, Inc. Goretex® is a suitable membrane. Goretex® is a microporous membrane containing pores that are too small for liquid to pass through, but are large enough to let gas through.

Figure 4:
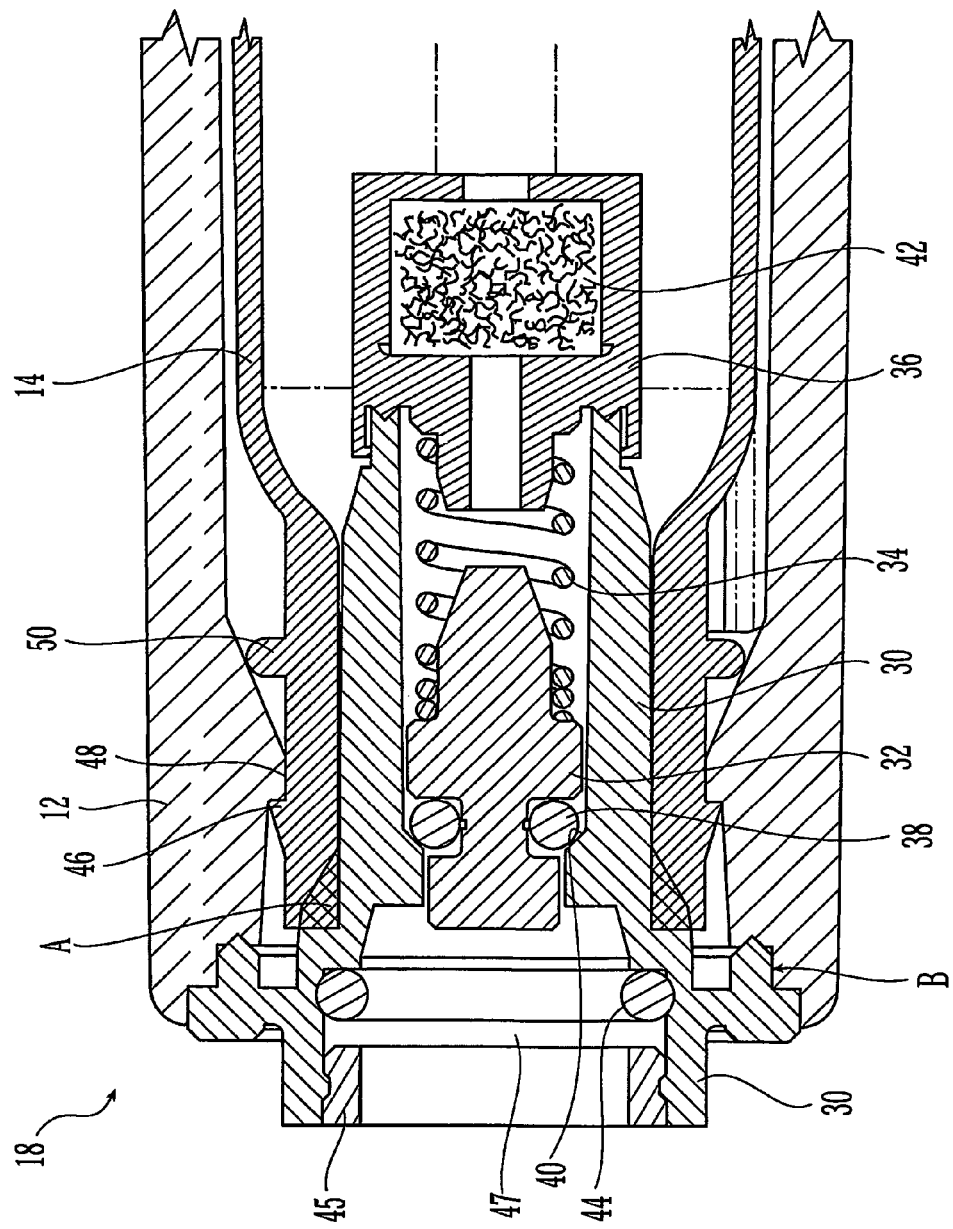
FIG. 4 is an enlarged view of the nozzle portion of the fuel supply.

Referring to FIGS. 2-4 and more particularly to FIG. 4, nozzle 18 houses the first valve component of a two-component shut-off valve. The second matching valve component (not shown) of the shut-off valve is similar to the valve component shown in FIG. 4, and resides in or on the electronic device that the fuel cell powers. Two component shut-off valves are fully disclosed in commonly owned, co-pending patent application Ser. No. 10/629,006 entitled "Fuel Cartridge with Connecting Valve," filed on Jul. 29, 2003. This patent application is also incorporated herein by reference in its entirety. The first valve component housed in nozzle 18 comprises valve body 30, and plunger 32 slidingly disposed within valve body 30. Spring 34 is held in compression within valve body 30 and is supported by spring retainer 36. Spring 34 biases plunger 32 outward, thereby pressing inner O-ring 38 against valve seat surface 40 to form a seal within the first valve component. Preferably, spring support 36 contains a porous filler, absorbent material or retention material 42 to regulate the transport of fuel through the first valve component. Filler, absorbent materials and retention materials are fully discussed in the '004 application. The porous filler, absorbent material or retention material can be located anywhere in the first (or second) valve component, or it can be located between the two corresponding valve components. It can be located upstream or downstream relative to the valve component or within the valve component.

In one embodiment, to open the first valve component, a portion of the second matching valve component, such as the valve body, contacts and pushes plunger 32 against the biasing force of spring 34. Inner O-ring 38 is then moved away from valve seat surface 40 to allow fuel to be transportable from liner 14 through filler 42 and the internal channel of spring retainer 36 and around plunger 32 to the fuel cell. Alternatively, another plunger from the second valve component contacts plunger 32 and pushes plunger 32 backward against the biasing force of spring 34.

The first valve component also contains outer O-ring 44 located on the inside of collar 45, as best shown in FIG. 4. Collar 45 is fixedly disposed to valve body 30 and collar 45 secures O-ring 44 in valve body 30. Additionally, collar 45 allows O-ring 44 to expand when it is inserted into valve body 30, as depicted by gap 47. Outer O-ring 44 forms an inter-component seal between the first valve component and the second valve component when the valve body of the second valve component is inserted through O-ring 44. Preferably, the inter-component seal is established before fuel is transported out of liner 14. Advantageously, outer O-ring 44 is attachable to the cartridge, so that a fresh O-ring is available for use when a new cartridge is installed. Preferably, fuel is not transported to the fuel cell until the seal in the second valve component is opened and outer O-ring 44 seals with the second valve component.

Other valves can be used with cartridge 10, including but not limited to the valve disclosed in United States published patent application no. 2003/0082427, which is incorporated herein by reference in its entirety. This reference discloses a self-sealing redundant septum/ball-and-spring valve system. Connected to the fuel supply is a poppet-type valve that has a ball biased by a spring against a septum or sealing surface. The septum is adapted to receive a hollow needle and the needle pushes the ball against the spring to open the valve. As the needle is withdrawn, the ball is pressed against the septum to re-establish the seal and the septum closes to provide a redundant seal. The ball is analogous to plunger 32, and the septum is analogous to O-ring 38 and sealing surface 40. The present invention is not limited to any particular valve.

In FIG. 4, the components shown with cross-hatching lines are overlapping each other, e.g., between outer O-ring 44 and valve body 30 and between the opening of bladder 14 and valve body 30. The overlaps indicate that one or both components are compressed, when the components are assembled to form the cartridge.

As discussed above, the materials for the components of cartridge 10 are selected to be compatible with the fuels, e.g., methanol. In a preferred embodiment, the components described above are made from the following suitable materials:

| Cartridge Components | Suitable Materials |
| --- | --- |
| Outer casing 12 | Low density polyethylene (LDPE), High density polyethylene (HDPE), polyacetal resin or acetal polyoxymethylene (POM), polypropylene (PP), polyethylene terephthalate (PET), Polyethylene naphthalate (PEN), nylon, metals, and blends thereof. |
| Inner liner 14 | Fluorinated LDPE, LDPE, laminate (PP, PE, ethylene vinyl acetate (EVA), fiberglass, microglass, polytetrafluoroethylene (PTFE)) |
| Valve body 30 | POM, PE, PP, PET, stainless steel, etc. |
| Plunger 32 | Stainless steel 1807, 1802 or 300 series, other metals. |
| Spring 34 | Stainless steel 303 or 316, other metals, ethylene propylene rubber (EPM), ethylene propylene diene methylene terpolymer (EPDM), fluoro-elastomer, Buna N Nitrile, other nitrile rubbers, emulsion-styrene butadiene rubber (E-SBR), POM or other engineering plastics. |
| Spring support 36 | POM, PE, PP, PET, stainless steel, etc. |
| Inner O-ring 38 | EPDM. |
| Outer O-ring 44 | EPDM. |
| Collar 45 | POM, PE, PP, PET, stainless steel, etc. |

In accordance to the present invention, the materials in contact with the fuel, e.g., acetal polyoxymethylene, fluorinated polyethylene, EPDM and stainless steels, are compatible with the fuel. In other words, the fuel, namely methanol, does not significantly reduce or breakdown the materials. Each material is selected to perform a predetermined function, i.e., fluorinated polyethylene needs to contain the fuel; stainless steel and EPDM are used for the valve; and acetal polyoxymethylene and fluorinated polyethylene are compatible for ultrasonic welding, as discussed below. Preferably, the best material is selected to perform a specific function in the fuel cartridge.

Acetal polyoxymethylene is commercially available as Delrin® from DuPont. Delrin® DE9494 is a suitable grade for use in the present invention. Inner liner 14 is in direct contact with the fuel and is preferably fluorinated to increase its resistance to methanol or increase its impermeability to methanol. Fluorination and lamination are a preferred way to render a polymer more resistant to methanol fuel. Fluorination describes a process where at least one hydrogen atom in the polymer is removed and replaced with a fluorine atom. In contrast, perfluorination is a process where all the hydrogen atoms are replaced with fluorine atoms. Inner liner 14 can be made from a fluorinated polymer, or more preferably from a polymer and then the inner liner is fluorinated afterward. Alternatively, inner liner can be made from a laminate having at least two layers. The materials for the laminate are selected from PP, PE, EVA, fiberglass, microglass and PTFE, as discussed in the table above.

To seal the cartridge, snap-lock or snap-fit 46 of inner liner 14 is inserted into nozzle 18 until it is locked to ledge 48. Inner liner 14 optionally also at least one barb 50 which engages with a slanted inside wall of outer casing 12 to hold the inner liner in place. Illustrated as area A in FIG. 4, the opening of bladder 14 is placed outward toward outer casing 12 by valve body 30, thereby improving the retention of the liner inside the outer casing. An ultrasonic welder (not shown) melts the plastic materials designated as seal area B to seal valve body 30 to outer casing 12.

The application of ultrasonic energy to join plastic components has been utilized in many industries. In ultrasonic welding, a solid-state power supply transforms electrical energy to 20 kHz or 40 kHz ultrasonic energy. A converter changes this electrical energy into ultrasonic mechanical vibratory energy. A horn transmits the ultrasonic mechanical energy directly to the parts to be assembled. A combination of applied force, surface friction, and intermolecular friction at the mating surface between the parts to be joined elevates the temperature until the melting points of the materials are reached. Force is maintained after the vibrations cease and a molecular bond or weld at the interface is produced. A more complete discussion of ultrasonic welding is found in U.S. Pat. No. 6,115,902, entitled "Method of Manufacturing a Razor," and assigned to BIC Corporation. The '902 patent is incorporated herein by reference in its entirety. To affect a seal, the joined materials should be similar or compatible. Preferably, the joined materials are chemically similar or have similar melting points so that both are melted at about the same time.

The present invention is not limited to the methanol compatible materials disclosed above, and is also not limited to methanol resistant materials. Depending on the fuel stored in the cartridge, suitable resistant materials can be selected.

For example, suitable methanol compatible materials that can be used to make O-rings include various kinds of rubber including fluororubber (FKM), fluorosilicone rubber (FVMQ), nitrile rubber (NBR), hydrogenated nitrile rubber (H-NBR), a mixture of acrylontrile-butadiene rubber and polyvinyl chloride (NBR-PVC), a mixture of FKM and FVMQ, acrylic rubber (ACM), and silicone rubber (Q). The most preferable rubber is fluororubber, and particularly a binary type of fluororubber, such as vinylidene fluoride-hexafluoropropylene rubber (VDF-HFP), tetrafluoroethylene-propylene rubber or tetrafluoroethylene perfluoromethyl vinyl ether rubber, or a ternary type of fluororubber, such as vinylidene fluoride-hexafluoropropylene-tetrafluoroethylene (VDF-HFP-TFE) rubber. Other suitable materials further include of crystalline resins having a melting point at a temperature of 140° C. or above, including, among others, fluororesins such as tetrafluoroethylene-hexafluoropropylene-vinylidene fluoride (THV), polytetrafluoroethylene (PTFE), a tetrafluoroethylene-perfluoroalkoxy ether copolymer (PFA), a tetrafluoroethylene-hexafluoropropylene copolymer (FEP), an ethylene-tetrafluoroethylene copolymer (ETFE) and polyvinylidene fluoride (PVDF), polyamide resins such as PA6T, PA6, PA11 and PA12, and polyester resins such as polybutylene terephthalate (PBT) and polyethylene terephthalate (PEI), which are all high in moldability and fluid impermeability. Other suitable rubbers include styrene-butadiene rubber (SBR), butadiene rubber (BR), isoprene rubber (IR), natural rubber (NR), low-nitrile NBR, ethylene-propylene-diene rubber (EPDM), butyl rubber (IIR), silicone rubber (Q) and phosphonitrilefluororubber (PNF), epichlorohydrin rubber (ECO), nitrile rubber (NBR), chloroprene rubber (CR), urethane rubber (U), fluorosilicone rubber (FVMQ), hydrogenated nitrile rubber (H-NBR), chlorosulfonated polyethylene rubber (CSM), chlorinated polyethylene rubber (CPE), chlorinated butyl rubber (CI-IIR), brominated butyl rubber (Br-IIR), acrylic rubber (ACM), a mixture (NE) of NBR and ethylene-propylene rubber (EPR). These rubber materials are further discussed in U.S. Pat. No. 6,543,785 to Katayama et al. Another suitable resistive rubber is fluoric synthetic rubber, which does not include the addition of metal oxide and/or metal hydroxide as bridging sites, as discussed in U.S. Pat. No. 5,407,759 to Ohsuga. Instead, iodine and/or bromide provide such bridging sites. Additionally, fluorinated hydrocarbon elastomers are resistant to methanol.

Additionally, solid polyurethanes that are resistant to alcohols (methyl and ethyl) are usable. Polyurethane is the cured copolymer of an isocyanate and a polyol. These components when mixed before curing contain a dibutyl tin dilaurate catalyst in an amount respective to the cure rate. The polyurethane sealant also contains zinc borate as the resistance to degradation in amounts between 3% and 30% by weight. Fuel resistant polyurethane is further discussed in U.S. Pat. No. 6,523,834 to Phillipson, which is incorporated herein by reference.

A suitable resistive material for outer casing 12 is a relatively rigid polyphenylene oxide (PPO) or a modified PPO available as NORYL® from General Electric Company. Preferably, the modified PPO may contain up to 30% of microglass fillers.

Yet, another suitable class of methanol compatible material includes ion exchange polymers that are usable as the polymer electrolytic membrane or proton exchange member (PEM) in the fuel cell. The most common PEM is perfluorosulfonic acid copolymer commercially available as Nafion® from Dupont, as discussed above. However, perfluorosulfonic acid copolymers are expensive and are permeable to methanol. As disclosed in U.S. Pat. No. 5,409,785 to Nakano et al, a three-dimensional structure formed by crosslinking a poly(vinyl alcohol), and a poly(styrenesulfonic acid) (PSSA-PVA) is held by the three-dimensional structure. The three dimensional structure has a methanol-shielding ability. The '785 patent discusses in detail a method of making PSSA-PVA copolymer, and is incorporated herein by reference in its entirety.

In accordance with another aspect of the present invention, a composite coating resistant to degradation can be deposited by electroplating to a surface of any component of cartridge 10, e.g., outer casing 12, inner liner 14, valve body 30 and plunger 32. As disclosed in U.S. Pat. No. 4,950,562 to Steward et al, the composite coating is a chromium-fluorocarbon composite, which comprises a copper and/or nickel undercoat, a layer of porous chromium and a fluorocarbon polymer impregnating the pores in the chromium layer. The coating can also be applied with chemical vapor deposition or plasma vapor deposition.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

We claim:

1. A method for sealing a fuel supply, wherein the fuel supply comprises a valve, an outer casing including a first opening, and an inner liner including a second opening, the method comprising the steps of:
   (i) inserting the valve of the fuel supply into the second opening of the inner liner;
   (ii) attaching the valve to the inner liner by press-fitting such that the second opening of the inner liner is placed outward toward outer casing by the valve body for improving the retention of the inner liner inside the outer casing;
   (iii) securing the inner liner and valve to the outer casing; and
   (iv) attaching the valve by heat to the outer casing.

2. The method of claim 1, wherein the method of attaching in step (iv) comprises the step of ultrasonic welding.

3. The method of claim 1, wherein the outer casing comprises at least one ledge and the inner lining comprises at least one snap-fit, wherein step (iii) further comprises the step of advancing the inner liner until the at least one snap-fit engages with the at least one ledge.

4. The method of claim 1, wherein the inner liner comprises at least one barb and the outer casing comprises at least one slanted inside wall, and wherein step (iii) further comprises the step of advancing the inner liner until the at least one barb engages with the at least one slanted inside wall.

5. The method of claim 1, further comprising the step of:
   (v) rendering the inner liner fuel-resistant.

6. The method of claim 5, wherein step (v) comprises the further steps of:
   (vi) fabricating the inner liner from a polymer; and
   (vii) fluorinating the inner liner.

7. The method of claim 5 wherein the polymer is low-density polyethylene.

8. The method of claim 5 wherein the fuel is methanol.

9. The method of claim 1, wherein a portion of the inner liner is held by the valve and a portion of the outer casing proximate the first and second openings.

* * * * *